3,356,734
PROCESS FOR THE PRODUCTION OF
ACETALDEHYDE
Michio Kuraishi, 27 Kogane-cho; Setsunobo Asano, 3-20 Kogane-cho; and Atsuo Takahashi, 34 Higashi Oyama-cho, all of Niigata, Japan
No Drawing. Filed Sept. 26, 1963, Ser. No. 311,642
Claims priority, application Japan, Feb. 28, 1963, 38/9,871
8 Claims. (Cl. 260—601)

The present invention generally relates to a new process for the production of acetaldehyde. In a particular aspect this invention relates to a process for the production of acetaldehyde by the interaction of methanol, hydrogen and carbon monoxide in the presence of cobalt catalyst and a halogen promoter.

The manufacture of acetic acid by reacting methanol with CO under pressures of from 200 to 700 atm. and temperatures of from 150° to 300° C. in the presence of iron group metals (Fe, Ni, Co) or their salts and halogen or halogen compounds, has been known. The production of ethanol by reacting methanol with CO and hydrogen under pressures of 200 to 700 atm. and temperatures of 150° to 300° C. in the presence of cobalt and iodine has been known as methanol homologation. In the former reaction, due to the fact that the product is highly corrosive and that the rate of reaction is slow when operating below pressures of 300 Kg./cm.$^2$, many difficulties are encountered in entering into commercial scale production. In the latter reaction, because of the slow reaction velocity and moreover because of the fact that a great many by-products are produced which are very difficult to separate, there is also little chance of achieving commercial scale production.

The method of the present invention of producing acetaldehyde selectively from methanol was discovered while studying the conditions under which methanol reacts with hydrogen and CO.

Accordingly, it is an object of the present invention to provide a new process for the production of acetaldehyde.

It is a specific object of the present invention to provide a new process for producing acetaldehyde by the interaction of methanol, hydrogen and carbon monoxide.

These and other objects and advantages of the invention will be apparent to those skilled in the art from the description of the invention.

In general, the present invention is a new process for manufacturing acetaldehyde which comprises reacting methanol with hydrogen and carbon monoxide in the presence of from about 0.1 to about 2 millimoles of cobalt catalyst per mole of methanol, said cobalt catalyst promoted by a halogen promoter, at a reaction temperature within the range of from about 150° C. to about 250° C. and a reaction pressure of from about 200 to about 700 atmospheres gauge.

Cobalt or its compounds and halogen or its compounds are used as catalysts. When low cobalt concentrations, such as less than 2 millimoles of cobalt per 1 mole of methanol, are used, it has been discovered that the reaction will selectively be in favor of producing acetaldehyde.

In the process of the present invention any type of cobalt can be used, however, cobalt salts which are soluble in methanol are preferred. Preferred soluble salts are the acetate, bromide, chlorate, chloride, iodide, linoleate, propionate, sulfide, etc. Cobalt acetate is specifically preferred. The halogens iodine, bromine, chlorine, or their compounds can be used. The alkali metal and alkaline earth metal iodides, bromides, and/or chlorides are preferred. Potassium iodide, lithium iodide, calcium iodide, and potassium periodide are specific examples of effective halogen compounds.

According to previous reports on the homologation reaction of methanol, it has already been observed that acetaldehyde exists in the product. However, the acetaldehyde was only produced in small amounts and was recognized as a by-product. For example, when 5 millimoles of cobalt acetate and 1.2 millimoles of iodine are added to 1 mole of methanol and reacted under 180–250 atm. pressure at 195–205° C., for two hours, 27% of the methanol is converted into other products; however, the yield of acetaldehyde is only 12% based on the amount of reacted methanol. It has been discovered that a characteristic reaction condition of the process of the present invention is the decreased quantity of cobalt catalyst. The cobalt catalyst concentrations used in the present process are different from those used in the previous homologation reaction. In the previous homologation reaction about 5 millimoles of cobalt per 1 mole methanol is charged, and no lower cobalt concentration had been adopted due to the slow reaction rate. However, when a series of synthetic experiments were carried out with constant iodine content and changing cobalt concentration, it was discovered that the yield of acetaldehyde increased remarkably with a decrease in cobalt concentration. When the cobalt concentration per 1 mole of methanol become lower than 2 millimole, the yields of alcohol and ester decreased; however, even though methanol conversion decreased, the selectivity of the reaction to produce acetaldehyde was more remarkable.

In the process of the present invention, it is necessary to use a halogen or a halogen compound as a catalyst promoter. In general from about 0.5 to about 5.0 milliatoms halogen concentration per mole of methanol may be used. About 2.5 milliatoms concentration per 1 mole methanol is preferable. When the quantity is increased above 5.0, it will usually cause heavy corrosion to the reactor and precipitants form in the product; consequently, the selectivity of the reaction decreases. Iodine is the most effective of the halogens and the alkali metal iodides and alkaline earth metal iodides are most excellent compounds to use in this invention.

When the cobalt concentration is decreased below about 0.1 the reaction rate decreases markedly. Therefore, from about 0.1 to about 2.0 millimole of cobalt concentration per mole of methanol is specifically preferred.

The formation of 1,1-dimethoxyethane in the product has been observed. When the cobalt concentration is low, greater formation of this material has been observed. This by-product can readily be decomposed to acetaldehyde and methanol by hydrolysis.

A characteristic of the present invention is to control the cobalt concentration at low levels to selectively produce acetaldehyde so that the acetaldehyde may easily be separated from the reaction product.

The overall processes of producing acetic acid or ethanol from methanol by first converting the methanol into acetaldehyde by the process of this invention and then converting the acetaldehyde into acetic acid or ethanol by well known processes are respectively superior as compared to conventional conversion of methanol into acetic acid or conversion of methanol into ethanol by homologation.

Examples of the present invention are as follows:

EXAMPLE I

*Reaction conditions*

Reactor: Acid proof autoclave.
Charged materials:
    0.0013 mole cobalt acetate,
    0.0013 mole iodine,
    1 mole methanol,
    Hydrogen and carbon monoxide at $H_2/CO$ mole ratio of 1.4/1.
Pressure: 300 to 400 atm.
Temperature: 185° C.
Reaction time: 2 hours.

After the reaction, the whole reactor was permitted to cool down to 50° C. The autoclave was then opened and the gas flow from the autoclave was cooled so that the main product, acetaldehyde, which has a boiling point of 21° C. at normal pressure, was collected in a trap.

After the gas flow from the autoclave stopped, the unreacted methanol and 1,1-dimethoxyethane were obtained as a residue by further cooling the autoclave. This by-product dimethoxyethane was separated into 1 mole of acetaldehyde and 2 moles of methanol by hydrolysis. The acetaldehyde and methanol are separated by rectification.

The methanol conversion in this reaction reached 48%. 0.19 mole acetaldehyde (39.6% per converted methanol) and 0.054 mole 1,1-dimethoxyethane (11.5% per converted methanol) were obtained.

EXAMPLE II 0.001 mole cobalt acetate and 0.0025 potassium periodate were added to 1 mole of methanol as catalyst and reacted at substantially the same conditions as in Example I. The methanol conversion reached 57% and 0.14 mole acetaldehyde (24.6% per converted methanol) and 0.14 mole 1,1-dimethoxyethane were obtained.

EXAMPLE III 0.0005 mole cobalt acetate and 0.0025 mole potassium iodate were added to 1 mole methanol as catalyst and reacted at substantially the same conditions as in Example I. The methanol conversion reached 50% and 0.087 mole acetaldehyde (17.5% per converted methanol) and 0.114 mole dimethoxyethane 68.5% per converted methanol) were obtained.

EXAMPLE IV 0.0005 mole cobalt bromide and 0.0013 mole bromine were added to 1 mole methanol as catalyst and react at substantially the same conditions as in Example I. The methanol conversion reached 38%, 0.013 mole acetaldehyde (34% per converted methanol) and 0.082 mole dimethoxyethane (65.4% per converted methanol) were obtained.

We claim:

1. A process for manufacturing acetaldehyde which comprises reacting methanol with hydrogen and carbon monoxide in the presence of from about 0.1 to about 2 millimoles of a methanol soluble cobalt catalyst per mole of methanol, said cobalt catalyst promoted by a halogen promoter selected from the group consisting of iodine, bromine, chlorine, alkali metal iodides, alkali metal bromides, alkali metal chlorides, alkaline earth metal iodides, alkaline earth metal bromides, and alkaline earth metal chlorides, at a reaction temperature within the range of from about 150° C. to about 250° C. and a reaction pressure from about 200 to about 700 atmospheres gauge.

2. The process of claim 1 wherein said halogen promoter is present in amount of from about 0.5 to about 5 milliatoms of halogen per mole of methanol.

3. The process of claim 1 wherein said cobalt catalyst comprises cobalt acetate.

4. The process of claim 1 wherein said halogen promoter is iodine present in an amount of from about 0.5 to about 5 milliatoms of iodine per mole of methanol.

5. The method of claim 1 wherein the mole ratio of hydrogen to carbon dioxide is 1.4 to 1.

6. A process for manufacturing acetaldehyde which comprises reacting methanol with hydrogen and carbon monoxide in the presence of from about 0.1 to about 2 millimoles of a methanol soluble cobalt compound catalyst promoted by a halogen promoter selected from the group consisting of iodine, bromine, chlorine, alkali metal iodides, alkali metal bromides, alkali metal chlorides, alkaline earth metal iodides, alkaline earth metal bromides, and alkaline earth metal chlorides in an amount of from about 0.5 to about 5 milliatoms of halogen per mole of methanol, at a reaction temperature within the range of from about 150° C. to about 250° C. and a reaction pressure of from about 200 to about 700 atmospheres gauge.

7. The process of claim 6 wherein said cobalt compound catalyst comprises cobalt acetate.

8. The process of claim 7 wherein said halogen comprises iodine.

References Cited

UNITED STATES PATENTS 3,091,644   5/1963   Aldridge    260—604

OTHER REFERENCES

Guyer et al.: "Chemical Abstracts," vol. 54, p. 9739g.

LEON ZITVER, *Primary Examiner.*

J. J. SETELIK, R. LILES, *Assistant Examiners.*